United States Patent [19]

Long

[11] Patent Number: 4,938,342
[45] Date of Patent: * Jul. 3, 1990

[54] CONTINUOUS CONVEYING MECHANISM

[76] Inventor: Marshall Long, 11147 Old Harbour Rd., North Palm Beach, Fla. 33408

[*] Notice: The portion of the term of this patent subsequent to Aug. 18, 2004 has been disclaimed.

[21] Appl. No.: 266,671

[22] Filed: Nov. 3, 1988

Related U.S. Application Data

[60] Continuation-in-part of Ser. No. 82,835, Aug. 6, 1987, Pat. No. 4,796,745, which is a division of Ser. No. 802,705, Nov. 29, 1985, Pat. No. 4,686,894.

[51] Int. Cl.$^5$ ............................................. B65G 25/00
[52] U.S. Cl. ................................ 198/774.3; 198/860.5; 198/776
[58] Field of Search ............................. 198/773–778, 198/860.5, 614

[56] References Cited

U.S. PATENT DOCUMENTS

| | | | |
|---|---|---|---|
| 2,339,832 | 1/1944 | Arnold | 198/774 X |
| 2,479,709 | 8/1949 | Arnold | 198/774 |
| 2,497,768 | 2/1950 | Hallead | 198/774 |
| 2,530,595 | 11/1950 | Blaha | 198/773 X |
| 2,933,179 | 4/1960 | Hirs | 198/778 X |
| 3,930,440 | 1/1976 | Ohkawa | 198/774 X |
| 4,071,137 | 1/1978 | Fink | 198/774 |
| 4,686,894 | 8/1987 | Long | 198/750 X |
| 4,714,153 | 12/1987 | Bischofberger et al. | 198/775 X |
| 4,738,577 | 4/1988 | Schalberger | 198/773 X |
| 4,796,745 | 1/1989 | Long | 198/774 X |

FOREIGN PATENT DOCUMENTS 1175816 8/1985 U.S.S.R. ............................... 198/773

*Primary Examiner*—Robert J. Spar
*Assistant Examiner*—D. Glenn Dayoan
*Attorney, Agent, or Firm*—Hovey, Williams, Timmons & Collins

[57] ABSTRACT

A continuous conveying mechanism especially adapted as the cooker for continuous grilling of hamburger patties and the like uses a shiftable grid which intermittently lifts the patties off a stationary grid and effects advancement after each lift-off until a U-shaped path is traversed extending initially through and terminating beyond one end of the cooker exteriorly thereof. The patties initially travel upwardly along a straight line with respect to the first pair of legs of the grids and then upwardly and arcuately along interleaved, radially extending rods, whereupon they invert and drop such as to travel upwardly and arcuately with respect to a second set of radially extending interleaved rods. Finally, the patties travel upwardly along a straight line with respect to a pair of legs of the grids forming the final stretch of travel.

6 Claims, 5 Drawing Sheets

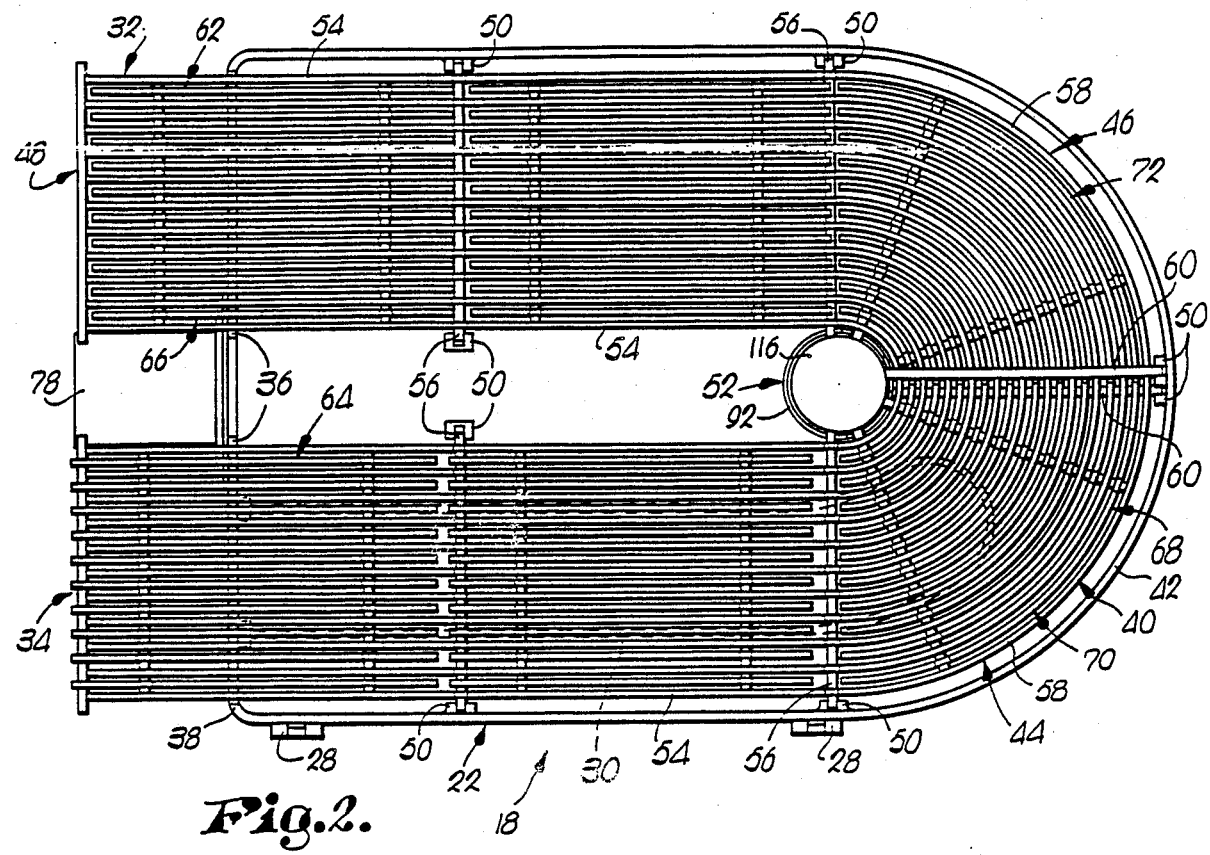

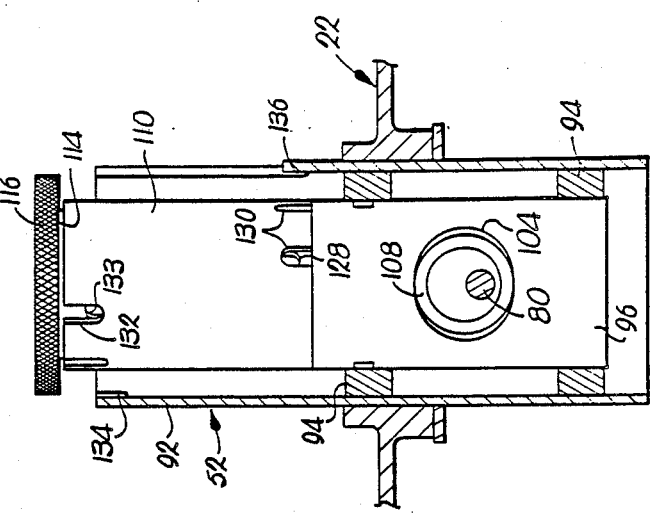
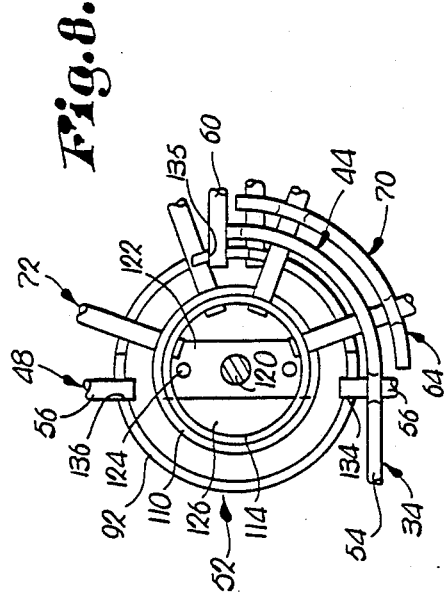
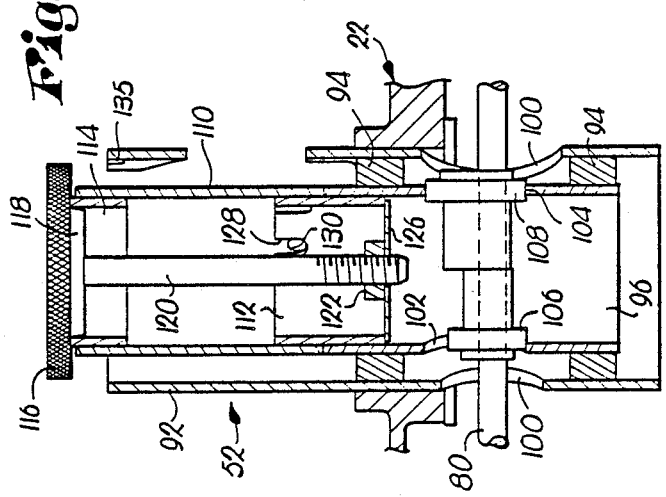
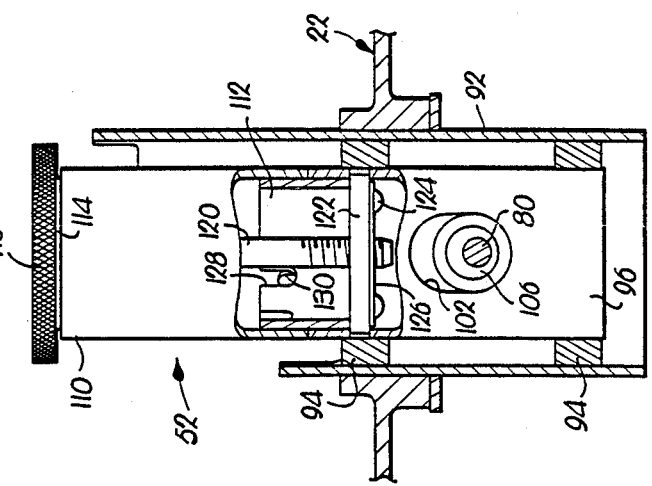

4,938,342

CONTINUOUS CONVEYING MECHANISM

This application is a continuation-in-part of identically titled application Ser. No. 07/082,835, filed Aug. 6, 1987 now U.S. Pat. No. 4,796,745, which was a division of application Ser. No. 06/802,705, filed Nov. 29, 1985, now U.S. Pat. No. 4,686,894 issued Aug. 18, 1987.

BACKGROUND OF THE INVENTION

Field of the Invention

The present invention relates to continuous grilling of food items after they enter the cooker, are advanced intermittently along a U-shaped path of travel and are discharged from the cooker, the grilling taking place on both sides by automatic inversion midway their path.

Apparatus has heretofore been suggested for cooking food as it is moved along a circular cooking platform. Known additionally are automatic, oval cooking grills which turn the articles over to cook each side. Moreover, walking beam conveyors are somewhat commonplace.

However, in the field of continuous grilling of food, the improvements of my instant invention are novel from many important standpoints. I use a movable grid having spaced rods which interleave with the spaced rods of a stationary grid during raising of the food products off the latter and advancing the same along a U-shaped path each time the movable grid is actuated. Walking beams raise and shift two legs of the food-advancing grid whereas a tubular assembly controls the arcuate movement to advance the products from one to the other of the straight legs.

SUMMARY OF THE INVENTION

The entire operation is effected by use of a single motor which not only actuates the walking beams but the tubular assembly at the inside center of the bight of two grids. Each grid at such bight is divided into a pair of quadrants such that the products are delivered from one quadrant to the other. The travel is upwardly and forwardly during the first half of the trip through the cooker and upwardly and rearwardly during the second half of product travel. Hence, the products must drop from the first to the second sections of the grid arrangements before commencing the return journey.

The quadrants are so arranged that during such dropping the products land upside down, thereby grilling both sides of the products before they emerge from the cooker. Electric cooking elements inside the cooker are spaced above the traveling products. For cleaning purposes the stationary grid is removably carried by the kettle, and the shiftable grid is removably carried by the walking beams and the tube assembly.

In the Drawings:

FIG. 1 is a side elevational view of a continuous cooking grill made according to one form of my present invention, the kettle and its cover being in section;

FIG. 2 is a top plan view thereof with the cover removed;

FIG. 5 is an enlarged, fragmentary, vertical cross sectional view through the tubular assembly at the axis of the quadrants of the grids;

FIG. 6 is a fragmentary, elevational view of the tubular assembly, partially in section, taken at right angles to FIG. 5 looking toward the quadrants;

FIG. 7 is a view similar to FIG. 6 looking away from the quadrants;

FIG. 8 is a fragmentary top plan view of the tubular assembly and certain grid work with the lid removed;

DESCRIPTION OF THE PREFERRED EMBODIMENT

Figure 3:
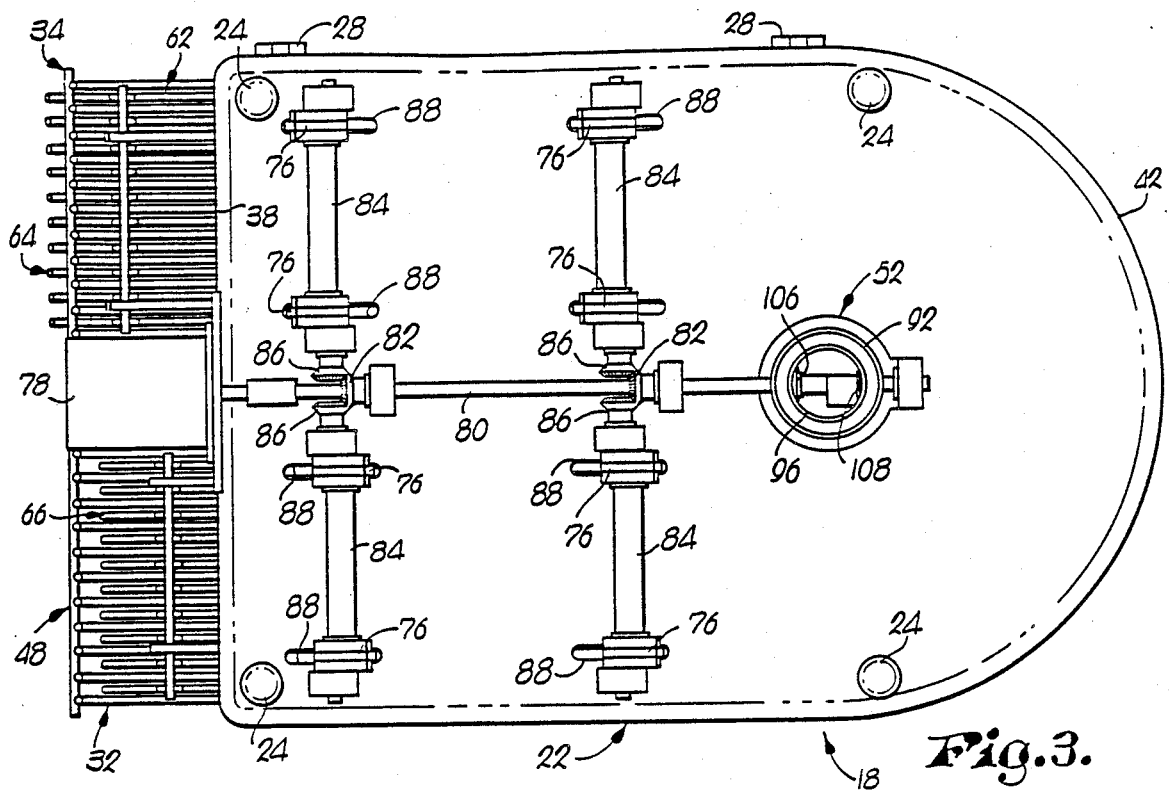
FIG. 3 is a view looking upwardly toward the bottom of the kettle.
Figure 4:
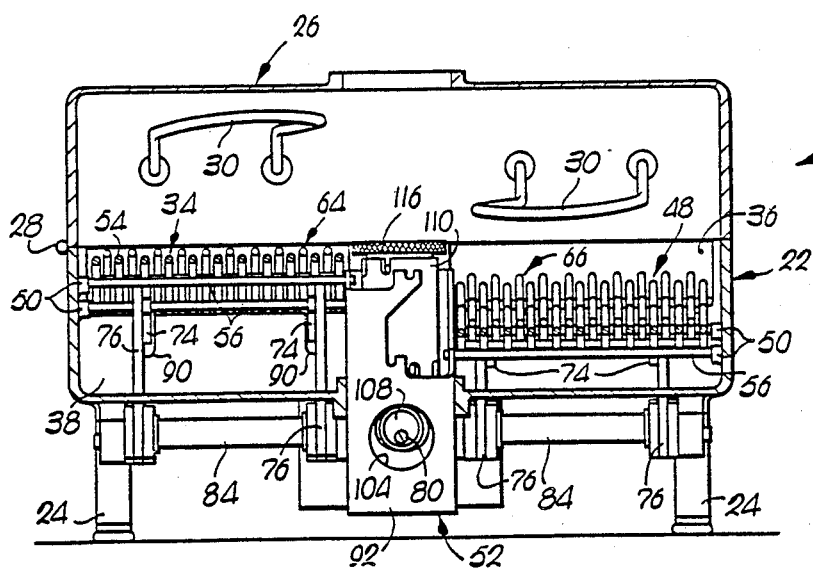
FIG. 4 is a cross sectional view taken on line 4—4 of FIG. 1.
Figure 12:
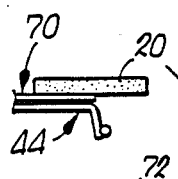
FIGS. 12-16 inclusive are diagrammatical views showing the inversion of a food item broiled by the cookers.
Figure 13:
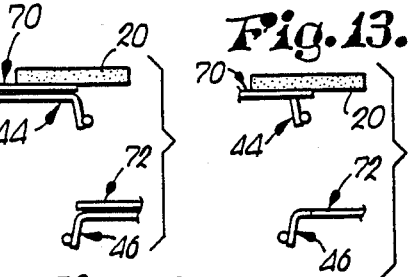
Figure 14:
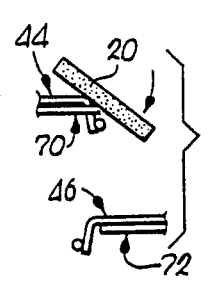
Figure 15:
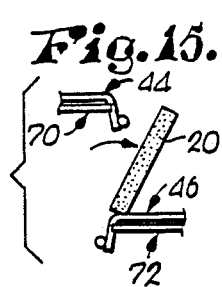
Figure 16:
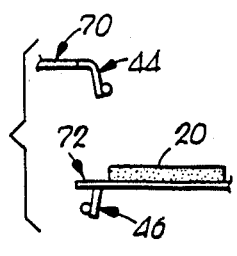

In the embodiment of FIGS. 1-8, a cooker 18 for broiling food items 20, such as hamburger patties (FIGS. 12-16), has a kettle 22 supported by legs 24 and carrying a cover 26 through use of hinges 28. After the items 20 enter one end of the kettle 22, they are advanced continuously by intermittent pulses along a U-shaped path and before emerging from the same end of the kettle 22, they are broiled on both sides as the result of being continuously subjected to heat thereabove emanating from electric heaters 30 carried by the cover 26 therewithin. Flipover of the items 20 midway their travel (FIGS. 12-16) occurs automatically as hereinafter explained.

A primary, stationary grid 32 has a U-shaped configuration to present a first elongated leg 34 which receive the items 20 exteriorly of the kettle 22 for advancement through an opening 36 in one end 38 of the kettle 22. The grid 32 has a semi-circular bight 40 at the opposite end 42 of the kettle 22, made up of a first quadrant 44, as a continuation of the leg 34, and a second quadrant 46 from which a second leg 48 extends, terminating outside the kettle 22 after passing through the opening 36, rendering the cooked items 20 accessible. The leg 48 is a continuation of the quadrant 46 and is disposed in spaced parallelism to the leg 34.

The leg 34 and its quadrant 44 slope upwardly as the end 38 of the kettle 22 is approached whereas the leg 48 and its quadrant 46 slope upwardly as the end 38 of the kettle 22 is approached, with the two U-shaped heaters 30 sloping accordingly (FIG. 1). The straight terminal ends of the quadrants 44 and 46 extend radially inwardly of the U-shaped end 42 with such end of the quadrant 44 spaced above the end of the quadrant 46 (FIGS. 12-16).

The grid 32 is removably supported by the kettle 22 through use of open top, notched lugs 50 rigid to the kettle 22 and by an upstanding tubular assembly 52 extending through the bottom of the kettle 22 at the axe 22 at the axis of the bight 40. Each leg 34, 48 has a plurality of spaced, longitudinal rod elements 54 rigidly interconnected by cross bars 56, the latter of which rest in the lugs 50. The quadrant sections 44 and 46 have arcuate rod elements 58 joined by cross bars 60 at the terminal ends thereof, the bars 60 being supported by lugs 50 at the center of the wall 42 and by the assembly 52.

A U-shaped secondary grid 62, shiftable up and down intermittently relative to the grid 32 is provided with sloping legs 64 and 66 corresponding to the legs 34 and 48 respectively and a bight 68 corresponding to the bight 40. And, as in the case of the grid 32, the bight 40 has a pair of sloping sections 70, 72 in the form of quadrants corresponding to the quadrants 44 and 46 respectively. Once again, as shown, the removable legs 64, 66 have straight, spaced, parallel rod elements secured to cross bars, and the removable quadrants have arcuate rod elements secured to cross bars. However, each leg 64, 66 has a pair of separate, end-to-end parts, and the quadrants 70, 72 are separate from each other and from the legs 64, 66.

Each leg 64, 66 is supported by a pair of elongated, inclined, spaced, walking beams 74 extending from the exterior of the kettle 22 and through the opening 36, terminating adjacent the assembly 52. The upper edges of the beams 74 are notched to receive the cross bars of the legs 64, 66 and each beam 74 has a pair of spaced supporting members 76 depending therefrom.

A motor 78 has a driveshaft 80 rotatably suspended from the bottom of the kettle 22 and provided with a pair of bevel gears 82. Each of the four driven eccentric shafts 84, rotatably suspended from the bottom of the kettle 22 and corresponding with the members 76, is provided with a bevel gear 86. Two of the eccentric shafts 84 radiate from the shaft 80 in one direction and have their gears 86 in mesh with corresponding gears 82, whereas another pair of the eccentric shafts 84 radiate in the opposite direction from the shaft 80 and also have their gears 86 in mesh with corresponding gears 82. Thus, the eccentric shafts 84 on one side of the shaft 80 are rotated in one direction and the opposite pair of eccentric shafts 84 are driven in the opposite direction by the shaft 80 during operation of the motor 78. Each member 76 has a circular hole rotatably receiving eccentric portion 87 of the shaft 84 (FIG. 1).

Accordingly, the beams 74 and their legs 64, 66 travel through essentially circular paths. The leg 64 rises, progresses toward the quadrant 44, descends and regresses toward the end 38 during each cycle. Simultaneously, the leg 66 rises, progresses toward the end 38, descends and regresses toward the quadrant 46. The rods of the legs of the grid 62 interleave with the rods 54 of the legs 34, 48 such that, during each cycle, the legs of the grid 62 rise above the legs 34, 48 to raise the items 20 off the legs 34, 48. After the items 20 on the leg 34 are raised they are advanced toward the quadrant 44 and then set back onto the leg 34. Conversely, after the items 20 on the leg 48 are raised they are advanced toward the end 38 and then set back onto the leg 48. Manifestly, such intermittent movement of the items 20 toward and away from the bight 40 takes place during each cycle of the beams 74. Incidentally, slots 88 in the bottom of the kettle 22 for clearing the members 76 are best shown in FIGS. 1 and 3, and slots 90 (FIG. 4) in the end 38 clear the beams 74. Not shown are two brackets which extend upwardly from the bottom of the kettle 22 for supporting the two lugs 50 shown in FIG. 2 between the legs 34 and 48.

Referring now in more detail to the assembly 52, especially FIGS. 5-8, there is provided an outer, upright tube 92, open at both ends and extending through the bottom of the kettle 22, to which the tube 92 is firmly attached. Bearings 94 in the tube 92 surround a vertically reciprocable, inner tube 96 which is oscillatory about its upright axis of reciprocation.

The tube 96 is so moved by the continuation of shaft 80 passing through diametrically opposed clearance openings 100 in the tube 92. The tube 96 has an oblong hole 102 with its major axis disposed vertically and an opposed, oblong hole 104 having its major axis disposed horizontally. A rotor 106 engaging the tube 96 in the hole 102 is eccentric to and rigid to the shaft 80, and a rotor 108 engaging the tube 96 in the hole 104 is eccentric to and also rigid to the shaft 80. A third tube 110 is an upper continuation of the tube 96, although separate therefrom, and a fourth tube 112 is surrounded by the tubes 96 and 110. A fifth tube 114 is disposed in the tube 110 at the upper end of the latter.

A knurled cap 116 has an inner flange 118 loosely fitted into the tube 114 and a bolt 120 rigid thereto and threaded into a bar 122 extending across the tube 112 and notched at its ends into the tubes 96 and 112. Fasteners 124 attach a closure plate 126 for the bottom of the tube 112 to the bar 122.

Notches are illustrated in FIGS. 5-7 for releasably receiving certain components of the grid assemblies 32 and 62. The tube 112 has a number of such notches 128 at its upper edge for receiving the cross bars of the quadrant 72 which are, in turn, cleared by notches 130 in the tube 110. The tube 110 is also provided with notches 132 in its upper edge which correspond to notches 133 in tube 114 for receiving the cross bar at the terminal end of the quadrant 70. The outer tube 92 has notches 134 and 135 at its upper end which receive the proximal bars 56 and 60 respectively of the leg 34 whereas the cross bar 56 of the leg 48 is received in a long notch 136 in the tube 92.

Therefore, the grids 32 and 62 may be removed from the kettle 22 by first turning the cap 116 to release the bolt 120 from the bar 122. Then, by slipping the tube 114 from within the tube 110, the quadrant 70 is released from the notches 132 and 133. Next, the tube 110 may be slipped off the tube 112 to clear the notches 128 and 130 such as to release the quadrant 72, and the leg 34 as well as the quadrant 48 can be readily removed from the notches 134 and 136. The legs 34 and 48 are simply lifted out of the lugs 50 and the legs 64 and 66 are lifted off the beams 74.

OPERATION

A predetermined, elevated temperature is produced in the cooker 18 by use of a suitable control for the heaters 30, and a desired speed of rotation of the shaft 80 is selected by a suitable control for the motor 78. The food items 20 placed on the leg 34 of the grid 32 exteriorly of the cooker 18, are advanced through the opening 36 of the kettle 22, and cooking continues until they exit through the opening 36 on the leg 48 outside the wall 38.

Rotation of the shaft 80 causes the shafts to rotate through the gears 82 and 86 causing rotation of all four eccentric shafts 84 in their corresponding members 76. Each time the leg 64 rises and progresses toward the quadrant 70, the items 20 are raised off the leg 34 and advanced toward the end 42 of the kettle 22. Simultaneously, each time the leg 66 rises and progresses away from the quadrant 72 the items 20 are raised off the leg and advanced toward the end 38 of the kettle 42.

All the while, the shaft 80 rotates the rotors 106 and 108 continuously to oscillate and raise and lower the tube 96 as well as all parts carried thereby. This causes the quadrant 70 to raise the items 20 (received from the leg 64) and carry the items 20 along an arcuate path toward the quadrant 72.

As demonstrated by FIGS. 12-16, when the items 20 arrive at the discharge end of the quadrant 70 (such end extending radially inwardly from the end 42 of the kettle 22 toward the assembly 52), they tilt downwardly and then fall upside down onto the lower quadrant 72 as shown by the arrows. Immediately, the inverse side of the items 20 begin to cook, such cooking continuing throughout the arcuate movement along the quadrant 72 and the leg 66. Manifestly, the movement of the inverted items 20 along the quadrant 72 until delivered to the leg 66 also results from the rise and fall of the tube 96 by action of the rotor 108 and oscillation of the tube 96 during rotation of the rotor 106.

The up and down and arcuate movement is imparted from the assembly 52 to the quadrants 70 and 72 simultaneously with the quadrant 70 moving arcuately away from the leg 64 and the quadrant 72 moving arcuately toward the leg 66 during travel of the items along the bight 68. As in the case of the action imparted to the legs 64 and 66 by the beams 74, the assembly 52 causes the quadrants 70 and 72 to descend below the quadrants 44 and 46 and regress toward the leg 64 and away from the leg 66 during each cycle, depositing the items 20 back onto the quadrants 44 and 46 each time the quadrants 70 and 72 pass beneath the upper surfaces of the quadrants 44 and 46.

During the successive, intermittent advancements of the items 20 along the leg 34, thence along the bight 40 and finally along the leg 48, they are continuously cooked on both sides to the extent desired by adjustment of the heaters 30 and/or the speed of the motor 78 prior to successive emergence of the items 20 from the end 38 of the kettle 22. While conveyance of the items 20 is not continual, there is no pause except somewhat momentarily each time the items come to rest on the grid 32.

Figure 9:
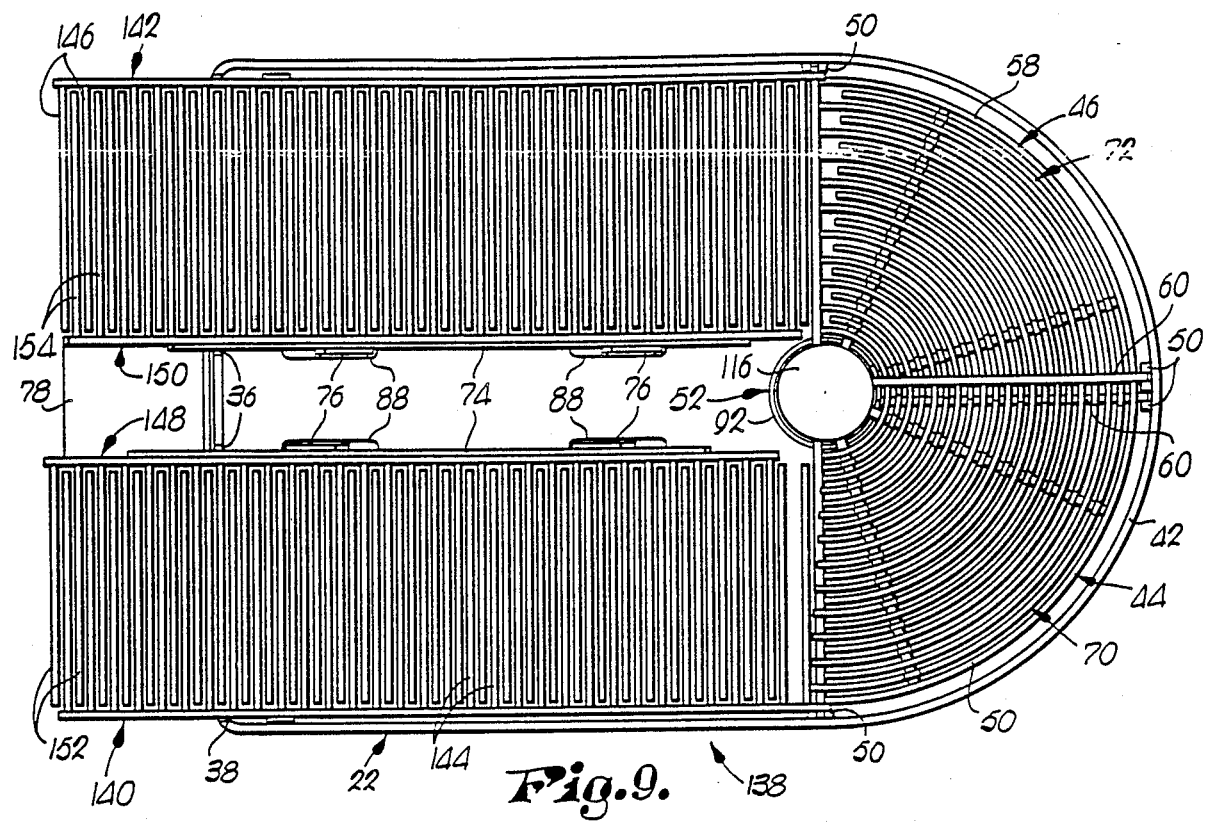
FIG. 9 is a view similar to FIG. 2 showing a modified form of the grill.
Figure 10:
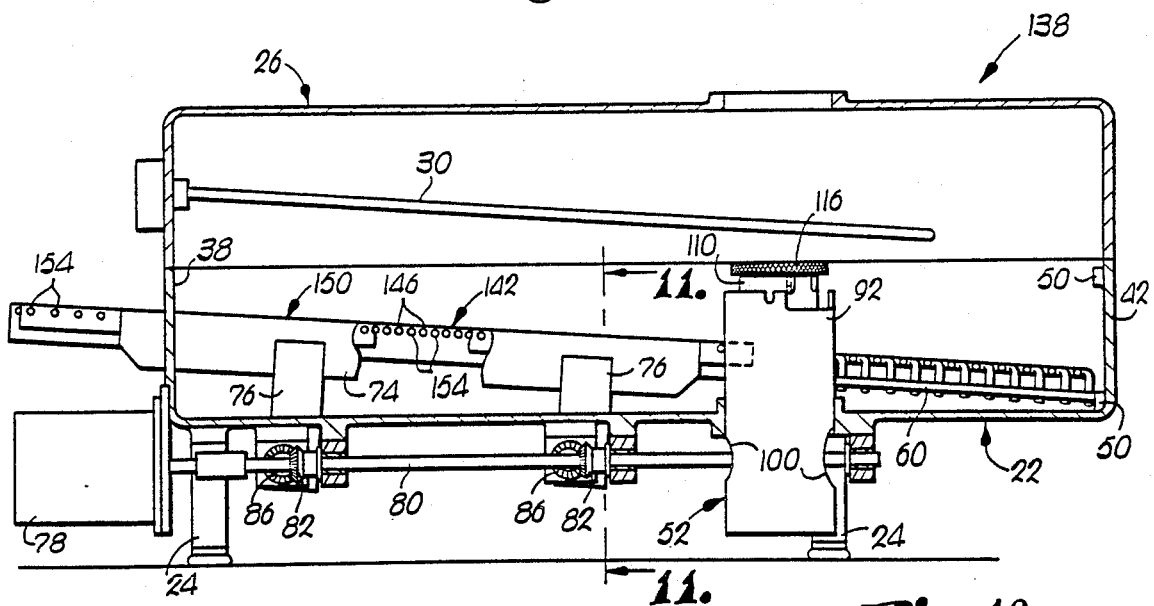
FIG. 10 is a view similar to FIG. 1 of the grill shown in FIG. 9.
Figure 11:
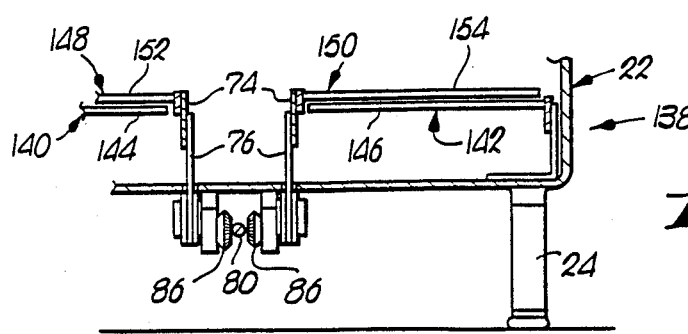
FIG. 11 is a fragmentary cross sectional view taken on line 11—11 of FIG. 10.

A cooker 138 as shown in FIGS. 9-11, differs from the cooker 18 of FIGS. 1-8 only with respect to the nature of the two legs of the stationary grid and of the movable grid. Therefore, the same numerals are used with respect to components which are the same in both cookers 18 and 138. Legs 140 and 142 of the stationary grid have rods 144 and 146 rigidly secured to the kettle 22 and extending inwardly from corresponding sides of the kettle 22. The spaced rods 144 continue from the exterior of the end wall 38 to the quadrant 44 and the spaced rods 146 continue from the quadrant 46 to and through the opening 36.

On the other hand, legs 148 and 150 of the movable grid each have a series of rods 152 and 154 extending toward the sides of the kettle 22. Once again the rods 152 continue through the opening 36 to the quadrant 70 and the rods 154 extend from the quadrant 72, terminating beyond the end wall 38. The inner ends of the rods 152 and 154 are secured to corresponding beams 74 carried by members 76 actuated by the motor 78 as above explained.

While the cookers 18 and 138 as described above contemplate a stationary grid, e.g. the primary grid 32 and a movable grid, e.g. the secondary grid 62, it is contemplated that both grids be movable if such is to be desired. It has been fully illustrated and carefully explained above how the grid 62 is caused to be moved in relation to the grid 32. As an additional embodiment, I contemplate that the grid 32 be moved in the same manner and through use of the same structural components as employed in connection with the grid 62, and duplication of such components for the grid 32 has not, therefore, been included in the drawings.

It is but necessary to further explain that the two movable grids would move alternately such that one would arrive at its greatest height as the other grid arrives at its lowermost position. Each grid would advance the product the same distance during each cycle of movement. Hence, the speed of advancement of each product would be doubled and, if as such result, the products are not sufficiently cooked by the time they emerge from the cookers 18 or 138, one need merely reduce the speed of motor 98.

Figure 17:
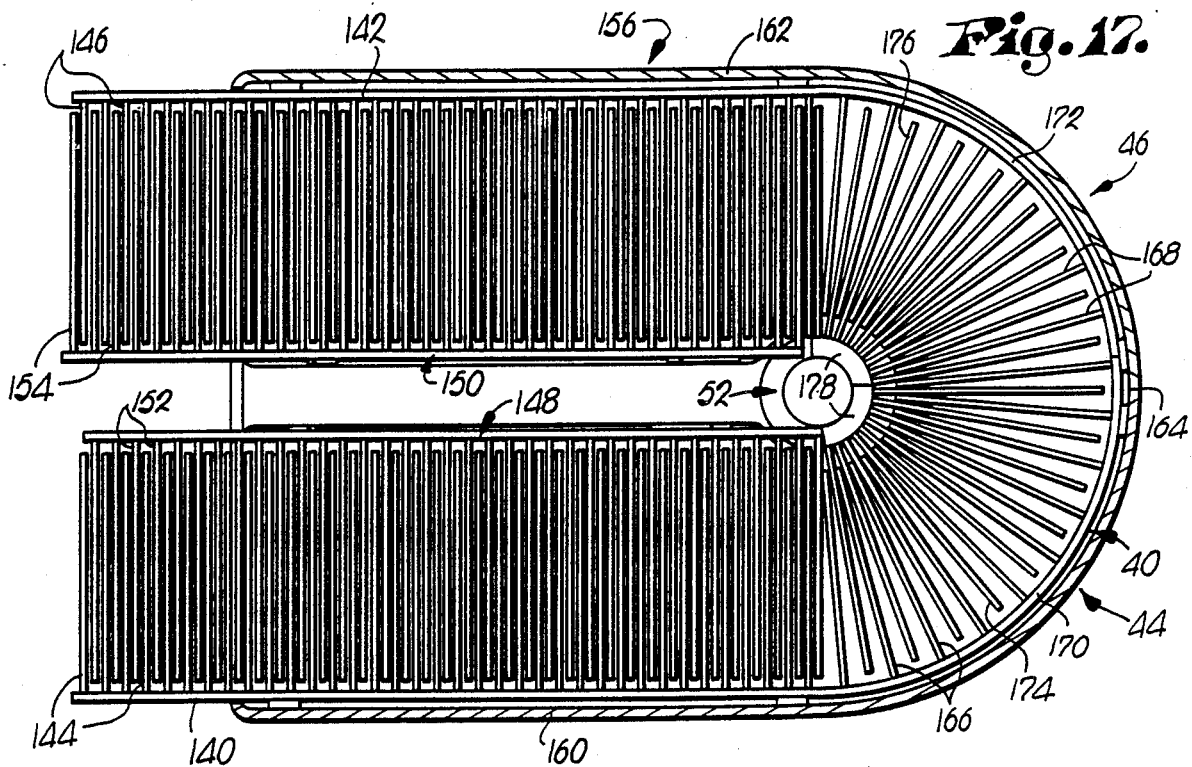
FIG. 17 is a top plan view similar to FIG. 2 showing a modified form of the grill.
Figure 18:
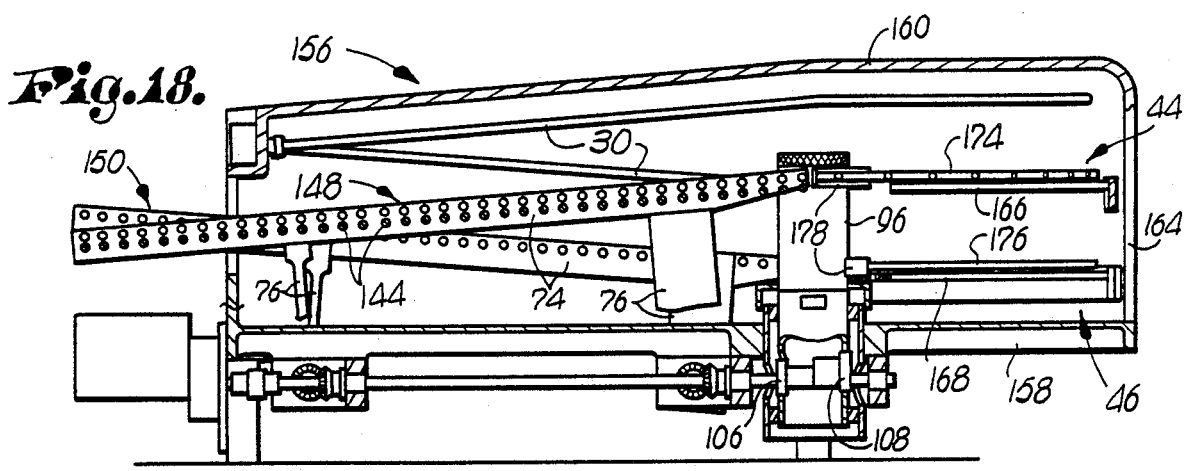
FIG. 18 is a side elevational view similar to FIG. 1 showing the grill of FIG. 17.
Figure 19:
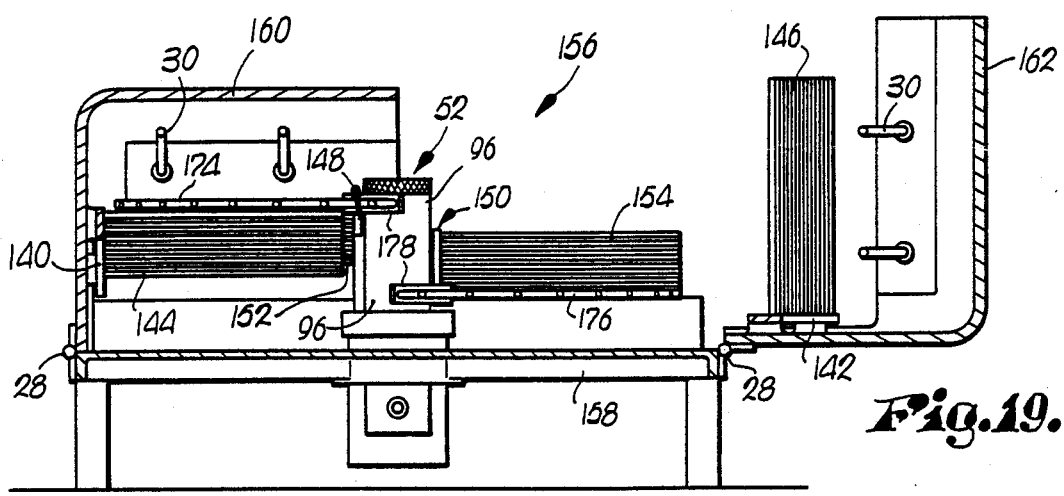
FIG. 19 is a cross sectional front elevational view of the grill of FIG. 17 similar to FIG. 4 but showing a portion of the hinged cover and stationary bars in an opened position.

A cooker 156 as shown in FIGS. 17-19 is similar to the cooker 138 except that radially and inwardly extending rods are substituted for quadrants 70 and 72 and rods which cyclically and successively raise, advance, lower and recede are substituted for quadrants 44 and 46. Therefore, the same numerals are used with respect to components which are the same as in cookers 18 and 138.

As in FIGS. 9-11, cooker 156 has legs 140 and 142 with corresponding spaced, stationary rods 144 and 146, and legs 148 and 150 of the movable grid with corresponding rods 152 and 154 secured to corresponding beam 74 and carried by member 76. However, in cooker 156, separate hinged covers 160 and 162 are pivotally mounted to kettle 158 by hinges 28. Covers 160 and 162 each carry heating elements 30 in the stationary rods 144 and leg 140 and stationary rods 146 and leg 142 are respectively mounted thereto. The covers 160 and 162 meet at junction 164 when in the closed, cooking position.

The cooker 156 also differs from cooker 138 with respect to the means for advancing the patties 20 through bight 40. The series of spaced, radially inwardly directed stationary rods 166 and 168 are mounted to arcuate legs 170 and 172 which are in turn mounted to covers 160 and 162 respectively. The leg 170 is a continuation of leg 148 and extends to junction 164 and corresponds to quadrant 70 of FIGS. 9-11. Leg 172 corresponds to quadrant 72 in FIGS. 9-11 and extends from junction 164 to leg 150. Stationary rods 168 are in a vertically lower plane than the plane defined by rods 166 and correspond to quadrant 72 in FIGS. 9-11. The stationary rods 166 and 168 extend inwardly in the manner of spokes toward assembly 52.

Orbiting rods 174, 176 corresponding respectively to quadrants 44, 46 in FIGS. 9-11, are interleaved between stationary rods 166, 168 and extend radially outwardly from inner tube 96 of assembly 52. As in the previous embodiments, inner tube 96 is engaged by rotor 106 to oscillate and thereby raise, advance, lower and recede orbiting rods 174 and 176 mounted to the tube 96 with respect to stationary rods 166, 168. Orbiting rods 174, 176 are removably mounted to brackets 178 carried by tube 96, by threaded ends on the rods, by pins or collars, or other conventional means. FIG. 8 shows a similar arrangement of rods, with quadrant 72 attached to tubes 110 and 96 (below tube 110); and in cooker 156 the number of rods 174, 176 are preferably greater than the radially extending rods comprising quadrant 72 in FIG. 8.

The manner of operation of cooker 156 is similar to cookers 18 and 138, in that the food items 20 placed on leg 34 of the grill are advanced as rods 152 move in an orbital and surrounding manner about adjacent stationary rods 144. In this manner, the food items 20 are successively "walked" along stationary rods 144 by successive lifting and advancing by rods 152 until the food items 20 have traveled the distance from end 38 to leg 170. As is shown by FIG. 18, food items 20 also move upward on an incline and receive heat from element 30.

Upon reaching leg 170, the food items 20 continue in an arcuate, counterclockwise path along bight 40. Tube 96 moves in an oscillatory manner while driven by rotors 106, 108. Each orbiting rod 174, 176 moves in unison with rods 152 and 154, and encircles respective adjacent stationary rod 166, 168 in surrounding relationship. Thus, when food item 20 is received from legs 140, 148, it is carried and advanced in a curved path in the counterclockwise direction as shown in FIG. 17. The orbiting rods 174, 176 receive the food item 20 from legs 140, 148 and continue their successive and cyclical motion of raising, advancing, lowering and receding in surrounding relationship to stationary rods 166, 168 located adjacent thereto. The food item 20 is deposited and remains on the next forward stationary rods 166 as the orbiting rod 172 moves beneath and rearwardly its adjacent stationary rod 16 before moving upward to carry another food item 20 forward.

Rods 166 and 174 are disposed in the first portion of bight 40 corresponding to leg 170, with the last rod 166 and first rod 168 of leg 174 being superposed in a vertical plane opposite junction 166. When a food item reaches the last rod 166, it falls downward and simultaneously turns over when the last orbiting rod 174 engages the food item 20 on an upward movement. This turning-over process is shown in FIGS. 12-16 and has been previously described. In the present embodiment, orbiting rods 174 correspond to quadrant 44 while stationary rods 166 correspond to quadrant 70 of FIGS. 12-16. Similarly, orbiting rods 176 correspond to quadrant 46 and stationary rods 168 correspond to quandrant 72 of FIGS. 12-16. As food item 20 engages the first of rods 166 of leg 170, the first of the orbiting rods 176 begin to successively advance the food item 20 until it reaches leg 142. The food item 20 then advances along leg 42 by successive oscillations of rod 154 until the food items 20 exit the cooker 158 through opening 36.

The embodiment of FIGS. 17-19 is especially useful when it is desired to clean the cooker 158. As shown in FIG. 19, because legs 140 and 170 are mounted to cover 160, and legs 142 and 172 are mounted to cover 162, the interior of the cooker 58 is easily accessible during cleaning.

I claim:

1. Conveying apparatus for moving articles along a substantially straight path of travel as well as along a curved path of travel, said structure comprising:
   a first assembly having a series of elongated, laterally spaced apart elements and a series of curved, laterally spaced apart elements
   disposed in generally end-to-end relationship to said elongated elements of said first assembly;
   a second assembly having a series of elongated, laterally spaced apart elements and a series of curved, laterally spaced apart elements disposed substantially in end-to-end relationship to said elongated elements of said second assembly,
   at least one of said assemblies having mechanism for cyclically and successively raising its series of elongated elements, advancing the same along a substantially straight path, lowering the same and retracting the same along a substantially straight path,
   said at least one of the assemblies having mechanism for cyclically and successively raising its series of curved elements advancing the same along an arcuate path, lowering the same and retracting the same along an arcuate path, the elongated elements and the curved elements of said one of said assemblies interleaving with the elongated elements and the curved elements respectively of the other of said assemblies during each cycle of movement of the moving elements,
   the elements of said one assembly rising above the elements of the other assembly during each cycle to raise and advance the articles sequentially along both a straight path as well as along an arcuate path said elongated elements of said one assembly being oriented for depositing said articles on said curved elements of the other assembly.

2. Conveying apparatus for moving articles along a substantially straight path of travel as well as along a curved path of travel, said structure comprising:
   a first assembly including a plurality of spaced, elongated elements oriented substantially transversely to said straight path of travel,
   a second assembly including a plurality of spaced, elongated elements oriented substantially path of travel, said elongated elements of said second assembly being oriented substantially parallel to and interleaved between said elongated elements of said first assembly,
   a third assembly including a plurality of radially extending elongated elements oriented substantially transversely to said curved path of travel,
   a fourth assembly including a plurality of radially extending elongated elements oriented substantially transversely to said curved path of travel, said elongated elements of said third assembly interleaved between said elongated elements of said fourth assembly,
   means for cyclically and successively raising, advancing, lowering and receding the elongated elements of one of said first and second assemblies whereby said elongated elements of said one of said first and second assemblies move in surrounding relationship to adjacent elongated elements of the other of said first and second assemblies,
   means for cyclically and successively raising, advancing, lowering and receding the elongated elements of one of said third and fourth assemblies in a curved path whereby said elongated elements of said one of said third and fourth assemblies move in surrounding relationship to adjacent elongated elements of the other of said third and fourth assemblies,
   said first assembly and said second assembly being oriented relative to said third assembly and said fourth assembly such that the longitudinal axis of both said first assembly and said second assembly do not intersect with the longitudinal axis of either said third assembly and said fourth assembly.

3. Conveying apparatus as set forth in claim 2 wherein said third and fourth asemblies are oriented to receive said articles from said first and second assemblies.

4. Conveying apparatus as set forth in claim 2 wherein said one of said first and second assemblies and said one of said third and fourth assemblies are raised, advanced, lowered and receded substantially in unison.

5. Conveying apparatus as set forth in claim 2 wherein said elongated elements of said fourth assembly extend radially inwardly and said elongated elements of said third assembly extend radially outwardly.

6. Conveying apparatus as set forth in claim 2 including a cover pivotally mounted to said conveying apparatus, wherein said second and fourth assemblies are mounted to said cover.

* * * * *